(12) United States Patent
Hula (10) Patent No.: US 10,619,825 B2
(45) Date of Patent: Apr. 14, 2020

(54) SUNLIGHT LAMP

(71) Applicant: AGU Baby AG, Baar (CH)

(72) Inventor: Andrei Hula, Minsk (BY)

(73) Assignee: AGU Baby AG, Baar (CH)

( * ) Notice: Subject to any disclaimer, the term of this patent is extended or adjusted under 35 U.S.C. 154(b) by 0 days.

(21) Appl. No.: 16/121,361

(22) Filed: Sep. 4, 2018

(65) Prior Publication Data

US 2020/0072440 A1   Mar. 5, 2020

(51) Int. Cl.
| | |
|---|---|
| *F21V 23/04* | (2006.01) |
| *F21V 9/02* | (2018.01) |
| *F21V 23/00* | (2015.01) |
| *F21V 3/04* | (2018.01) |
| *F21V 17/16* | (2006.01) |
| *F21V 8/00* | (2006.01) |
| *H05B 45/20* | (2020.01) |
| *H05B 47/16* | (2020.01) |
| *F21Y 115/10* | (2016.01) |
| *F21Y 105/12* | (2016.01) |
| *F21Y 113/13* | (2016.01) |

(52) U.S. Cl.
CPC ............... *F21V 9/02* (2013.01); *F21V 3/049* (2013.01); *F21V 17/164* (2013.01); *F21V 23/006* (2013.01); *F21V 23/0485* (2013.01); *G02B 6/0011* (2013.01); *H05B 45/20* (2020.01); *H05B 47/16* (2020.01); *F21Y 2105/12* (2016.08); *F21Y 2113/13* (2016.08); *F21Y 2115/10* (2016.08)

(58) Field of Classification Search
CPC .......... F21V 9/02; F21V 17/164; F21V 3/049; F21V 23/006; F21V 23/0485; H05B 33/086; H05B 37/0281; H05B 6/0011; G02B 6/0011; F21Y 2115/10; F21Y 2105/12; F21Y 2113/13
See application file for complete search history.

(56) References Cited

U.S. PATENT DOCUMENTS

| | | | | |
|---|---|---|---|---|
| 5,357,170 | A * | 10/1994 | Luchaco | H05B 37/02 315/149 |
| 6,211,626 | B1 * | 4/2001 | Lys | A61N 5/0616 315/291 |
| 8,779,681 | B2 * | 7/2014 | Adler | F21S 2/00 315/291 |
| 9,892,693 | B1 * | 2/2018 | Kumar | F21S 8/026 |
| 10,091,855 | B2 * | 10/2018 | Van Winkle | F21S 8/026 |

(Continued)

*Primary Examiner* — Tracie Y Green
(74) *Attorney, Agent, or Firm* — Procopio, Cory, Hargreaves & Savitch LLP (57) ABSTRACT

A sunlight-simulating sunlight lamp is provided, including a plurality of first LEDs, second LEDs and third LEDs installed on a printed circuit board in an even distribution; a holder provided with a control unit and a power supplier; and a lampshade made of a translucent material and mounted on the holder to form a space between the holder and the lampshade. The printed circuit board is received in the space. The plurality of first LEDs, second LEDs and third LEDs have respective color temperatures, and the control unit controls respectively the brightness of the plurality of first LEDs, second LEDs and third LEDs. The LED sunlight lamp provided can stimulate daylight of a day through changing the color temperature and brightness of the LEDs, making the lighting to be more like natural sunlight.

13 Claims, 8 Drawing Sheets

(56) References Cited

U.S. PATENT DOCUMENTS

| | | | |
|---|---|---|---|
| 2005/0185398 A1* | 8/2005 | Scannell, Jr. | A01G 9/02 |
| | | | 362/227 |
| 2007/0070624 A1* | 3/2007 | Sun | F21K 9/00 |
| | | | 362/240 |
| 2008/0291673 A1* | 11/2008 | Chen | F21S 6/003 |
| | | | 362/231 |
| 2010/0039792 A1* | 2/2010 | Meyers | F21L 2/00 |
| | | | 362/20 |
| 2011/0006688 A1* | 1/2011 | Shim | F21V 5/08 |
| | | | 315/119 |
| 2011/0089866 A1* | 4/2011 | Trotter | H05B 33/0818 |
| | | | 315/297 |
| 2012/0319593 A1* | 12/2012 | Jou | H05B 33/0869 |
| | | | 315/152 |
| 2015/0009666 A1* | 1/2015 | Keng | F21V 23/005 |
| | | | 362/235 |
| 2017/0322364 A1* | 11/2017 | Girotto | G02B 6/0076 |
| 2018/0077783 A1* | 3/2018 | Sooch | H05B 33/0863 |
| 2018/0260602 A1* | 9/2018 | He | G06K 9/0008 |

\* cited by examiner

SUNLIGHT LAMP

BACKGROUND

1. Technical Field

The present disclosure relates to the field of household appliances, in particular, to a sunlight-simulating sunlight lamp capable of being used as an indoor ceiling lamp or bracket lamp and capable to set a customized day's routine.

2. Description of Related Art

The beneficial effect of sunlight on the human body has been known for a long time, and the negative consequences from the lack of natural light can be quite serious—a headache, fatigue, nervousness and many other symptoms caused by vitamin D deficiency, leading to a decrease in body defenses and depression. Unfortunately, today people living in the modern industrialized society do not get much natural sunlight because they spend most of the time in indoor activities. Therefore, the quality of artificial lighting in a room is extremely important and should be very close in its parameters to the solar one (hereinafter referred to as sunlight lamp).

The existing sunlight lamps can stimulate the sunlight through modifying brightness or color temperature, but the modification of brightness or color temperature is unable to be carried out continuously, so that the stimulation of sunlight from sunrise to sunset cannot be made perfectly.

SUMMARY

The object of the present disclosure is to provide an LED sunlight lamp that simulates daylight by changing the color temperature from cold to warm and adjusting brightness. The sunlight-simulating sunlight lamp of the present disclosure can continuously change color temperature and brightness, enabling the light of the sunlight lamp to be more like natural sunlight.

According to one exemplary embodiment of the present disclosure, a sunlight-simulating sunlight lamp is provided, including plurality of first LEDs, second LEDs and third LEDs installed on a printed circuit board in an even distribution; a holder provided with a control unit and a power supplier; and a lampshade made of a translucent material and mounted on the holder to form a space between the holder and the lampshade. The printed circuit board is received in the space. The plurality of first LEDs, second LEDs and third LEDs have respective color temperatures, and the control unit controls respectively the brightness of the plurality of first LEDs, second LEDs and third LEDs.

In a preferred embodiment, the color temperature of each first LED light is lower than the color temperature of each second LED light, and the color temperature of each second LED light is lower than the color temperature of each third LED light.

In a preferred embodiment, the control unit comprises a pulse width modulation control circuit configured to respectively control the brightness of the plurality of first LEDs, second LEDs and third LEDs from 1%-100%, so that the entire color temperature of the sunlight-simulating sunlight lamp is adjusted in the range of 1800K to 7000K.

In a preferred embodiment, when the plurality of first LEDs, second LEDs and third LEDs are tuned to the maximum brightness, the sunlight-simulating sunlight lamp reaches an illumination of 11000-16000 lux.

In a preferred embodiment, an installation quantity for each of the plurality of first LEDs, second LEDs and third LEDs installed on the printed circuit board is in a range from 10 to 100 LEDs.

In a preferred embodiment, the plurality of first LEDs, second LEDs and third LEDs installed on the printed circuit board are arranged into a pattern of concentric circles.

In a preferred embodiment, each concentric circle comprises at least one first LED, at least one second LED and at least one third LED.

In a preferred embodiment, the plurality of first LEDs, second LEDs and third LEDs are provided with the same quantity in each of the concentric circles.

In a preferred embodiment, the lampshade comprises a light guide plate attached thereon, and the light guide plate is mounted between the lampshade and the printed circuit board.

In a preferred embodiment, the light guide plate is recessed towards the inside of the lampshade.

In a preferred embodiment, a switch which is a capacitive sensor is disposed on a surface of the lampshade facing the holder, and the switch is at an outer periphery of the lampshade.

In a preferred embodiment, the plurality of first LEDs are in serial connection, the plurality of second LEDs are in serial connection, and the plurality of third LEDs are in serial connection.

In a preferred embodiment, the plurality of first LEDs, second LEDs and third LEDs are in parallel connection.

In a preferred embodiment, the control unit comprises a wireless connection circuit configured to connect with a control device.

In a preferred embodiment, a fourth LED is configured to indicate that the sunlight-simulating sunlight lamp is powered on and is installed on an external surface of the holder.

In a preferred embodiment, the control unit includes a timer. The control unit is configured to adjust the value of color temperature of the first, second and third LEDs from a first value of color temperature to a second value of color temperature within 3 to 60 minutes. The first value of color temperature is smaller than the second value of color temperature.

In a preferred embodiment, the first value of color temperature is in a range from 1800K to 4000K, and the second value of color temperature is in a range from 5000K to 7000K.

To sum up, the sunlight lamp emits uniform soft light of different power levels at different times of the day and simulates natural sunlight, so as to help people staying in indoor space to reduce the symptoms such as fatigue, nervousness and seasonal mood swings caused by a deficiency of sunlight.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

As shown in FIG. 1 to FIG. 4, an exemplary embodiment of the present disclosure provides a sunlight-simulating sunlight lamp, including a lampshade 10, a printed circuit board 20 and a holder 30. A plurality of first LEDs 21, second LEDs 22 and third LEDs 23 are installed on the printed circuit board 20 in an even distribution. The holder 30 is disposed with a power supplier 32 and a control unit 33. The lampshade 10 is made of a translucent material and mounted on the holder 30, forming a space 40 with the holder 30. The printed circuit board 20 is positioned in the space 40. The control unit 33 controls respectively the brightness of the plurality of first LEDs 21, second LEDs 22 and third LEDs 23.

Figure 1:
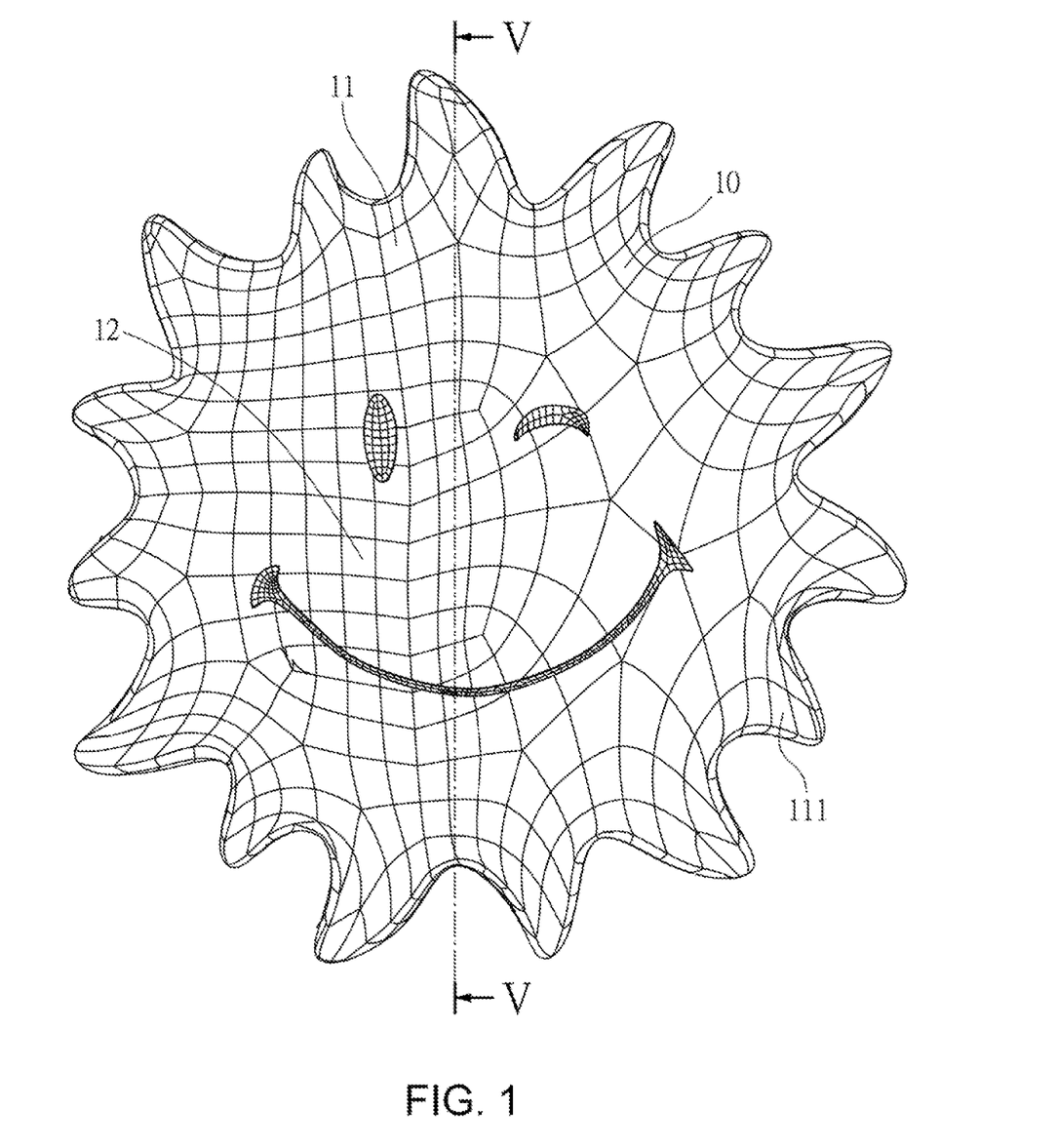
FIG. 1 is a plan view of the sunlight lamp according to the present disclosure.

Reference is made to FIG. 1. In an exemplary embodiment of the present disclosure, the lampshade 10 is in a radial shape and has a plurality of scattering tabs 11 formed on the periphery of the lampshade 10, in which the scattering tabs 11 have respective bending angles and none of the scattering tabs 11 is symmetrical to another scattering tab 11 relative to the geometric center of the lampshade 10. Thus, the shape of the lampshade 10 can imitate the shape of sun, and users, in particular children who are in favor of such a shape, can instinctively feel that the sunlight lamp is stimulating the lighting of natural sunlight.

Figure 2:
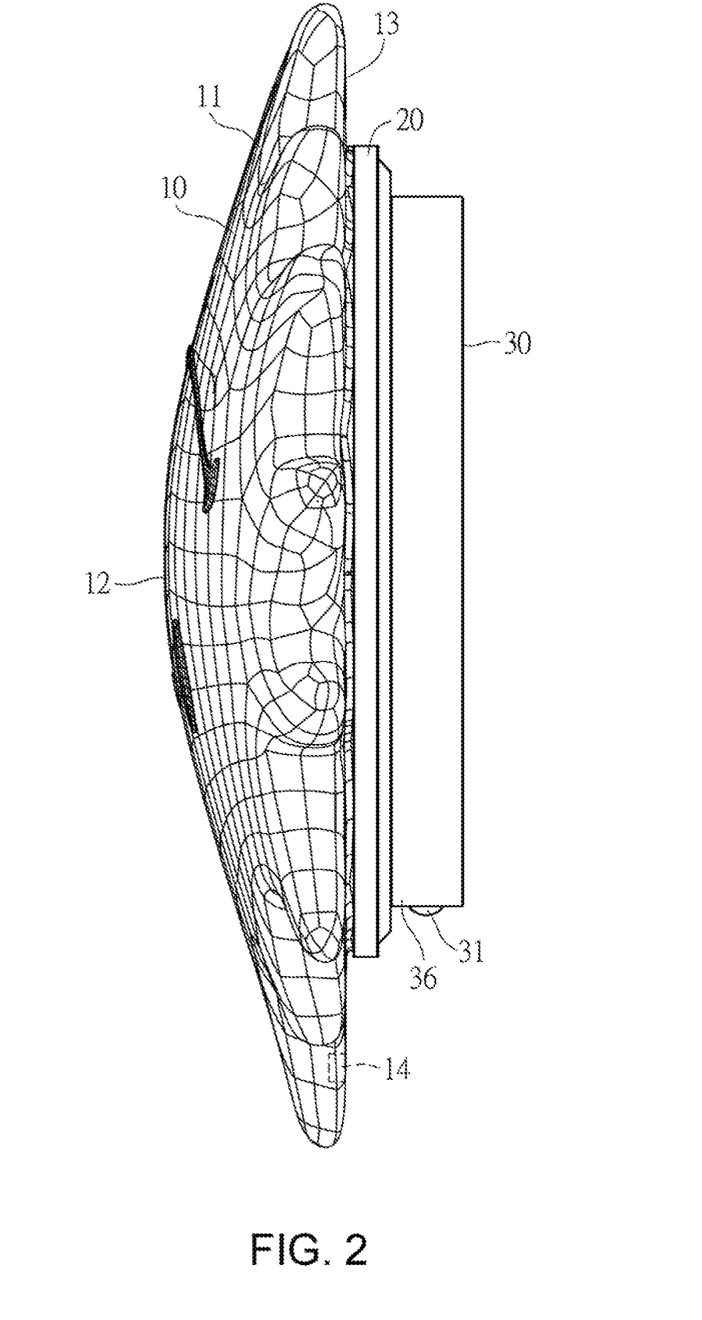
FIG. 2 is a side view of the sunlight lamp according to the present disclosure.

Referring to FIG. 2, a side view of the sunlight lamp according to the present disclosure is shown. The holder 30 and the lampshade 10 are connected by means of snaps, but the present disclosure is not limited thereto. The connection of the holder 30 and the lampshade 10 can be achieved by using adhesives, spring clip, hinge link, frictional joint, screw thread, or any other mechanical connection manners, as long as the holder 30 is not detached from the lampshade 10 easily. The lampshade 10 has a front surface 12 and a rear surface 13. The front surface 12 is in an arc shape and extends to the scattering tabs 11 to form a continuous arc-shaped surface. The rear surface 13 is the surface of the scattering tabs 11 opposite to the front surface 12. One of the plurality of scattering tabs 11 (i.e. the periphery of the lampshade 10), preferably the rear surface of the scattering tabs 111 as shown in FIG. 1, is disposed with a switch 14 configured to turn on or turn off the sunlight lamp. In an exemplary embodiment of the present disclosure, the switch 14 is an capacitive sensor which is connected with the control unit 33 (not shown in the figures), and allows the user to turn on or turn off the sunlight lamp only by touching smoothly the switch 14 through fingers. However, the present disclosure is not limited to above manner, and the switch 14 can be a press button, a push rod, or a turning knob.

A fourth LED 31 configured to indicate the power-on state of the sunlight lamp is installed on an external surface of the holder 30. Specifically, as shown in FIG. 2, the fourth LED 31 is installed at a side surface 36 of the holder 30. Preferably, the fourth LED 31 is a yellow LED configured to indicate whether the sunlight lamp is supplied to power or not. The power supplier 32 of the sunlight lamp includes a power cord and a plug used to connect to an external power. In another exemplary embodiment of the present disclosure, the power supplier 32 is a battery.

Figure 3:
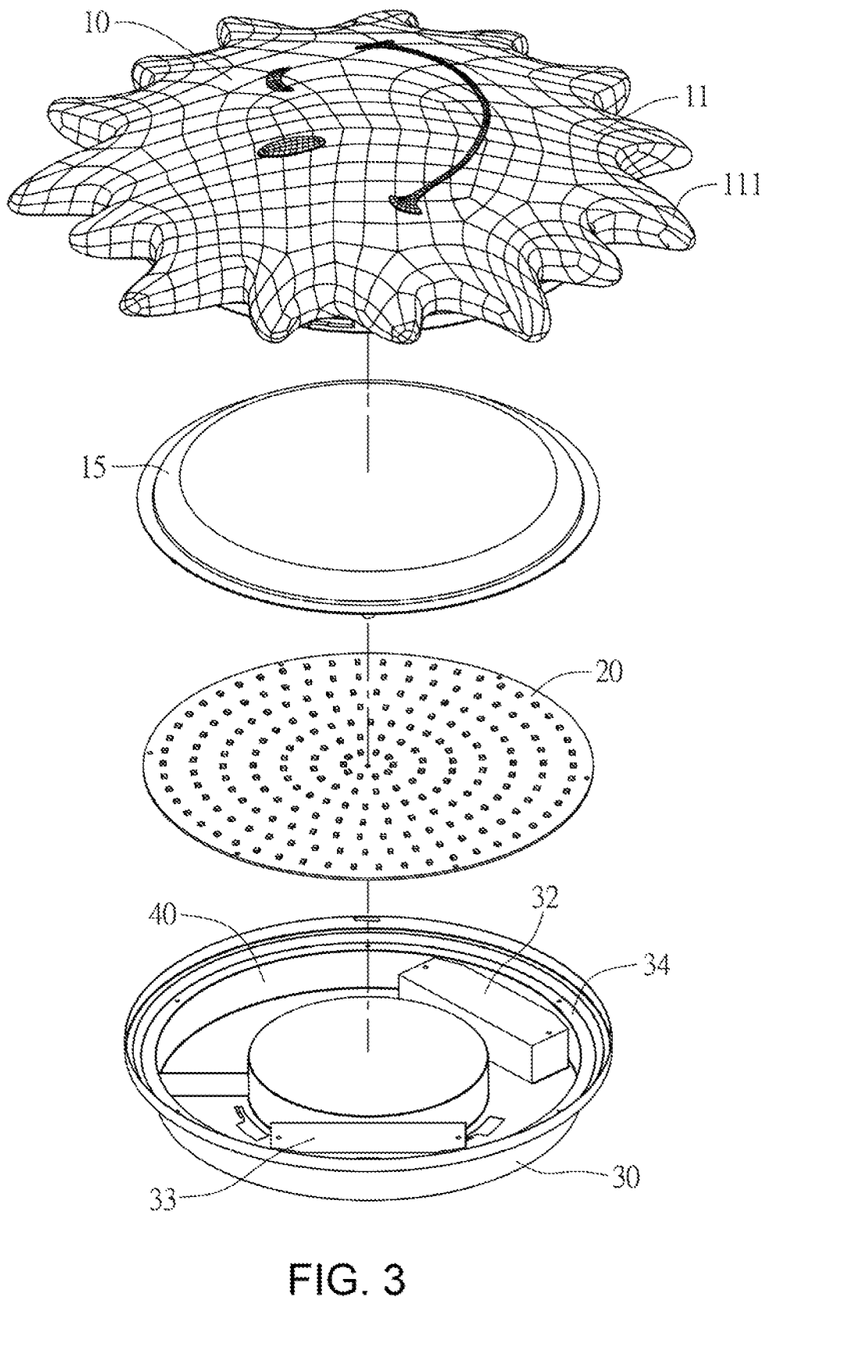
FIG. 3 is an exploded view of the sunlight lamp according to the present disclosure.
Figure 5:
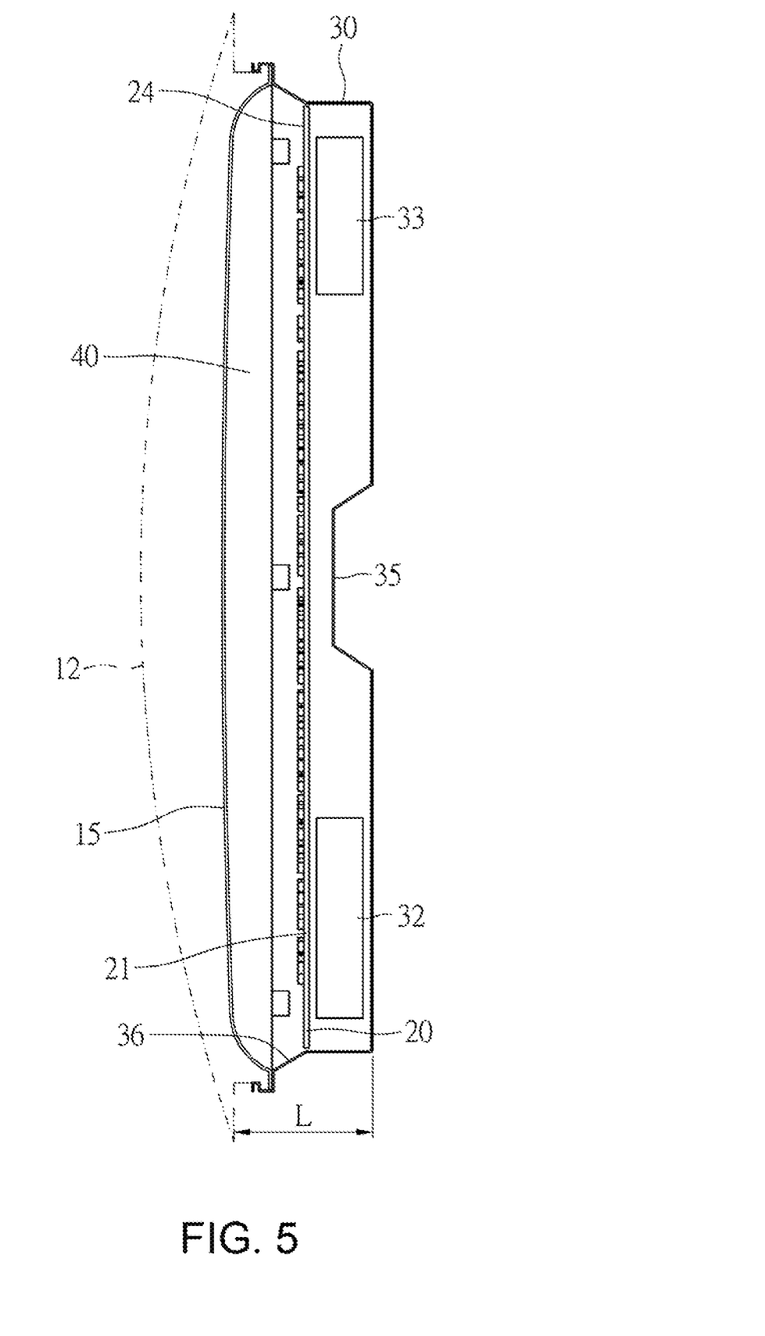
FIG. 5 is a cross-sectional diagram along line V-V according to FIG. 1.

FIG. 3 is an exploded view of the sunlight lamp according to the present disclosure, and FIG. 5 is a cross-sectional diagram along line V-V according to FIG. 1. In an exemplary embodiment of the present disclosure, the printed circuit board 20 is disposed in the space 40 formed between the holder 30 and the lampshade 10. More specifically, an annular shoulder 34 is formed inside the holder 30, and the printed circuit board 20 is fixed to the annular shoulder 34 of the holder 30. As shown in FIG. 5, after being fixed, the printed circuit board 20 is located above the power supplier 32, the control unit 33 and a protrusion portion 35 at the bottom of the holder 30. The printed circuit board 20 does not directly abut against the power supplier 32, the control unit 33 and the protrusion portion 35, so as to facilitate better heat dissipating effect when each component is in operation.

Figure 4:
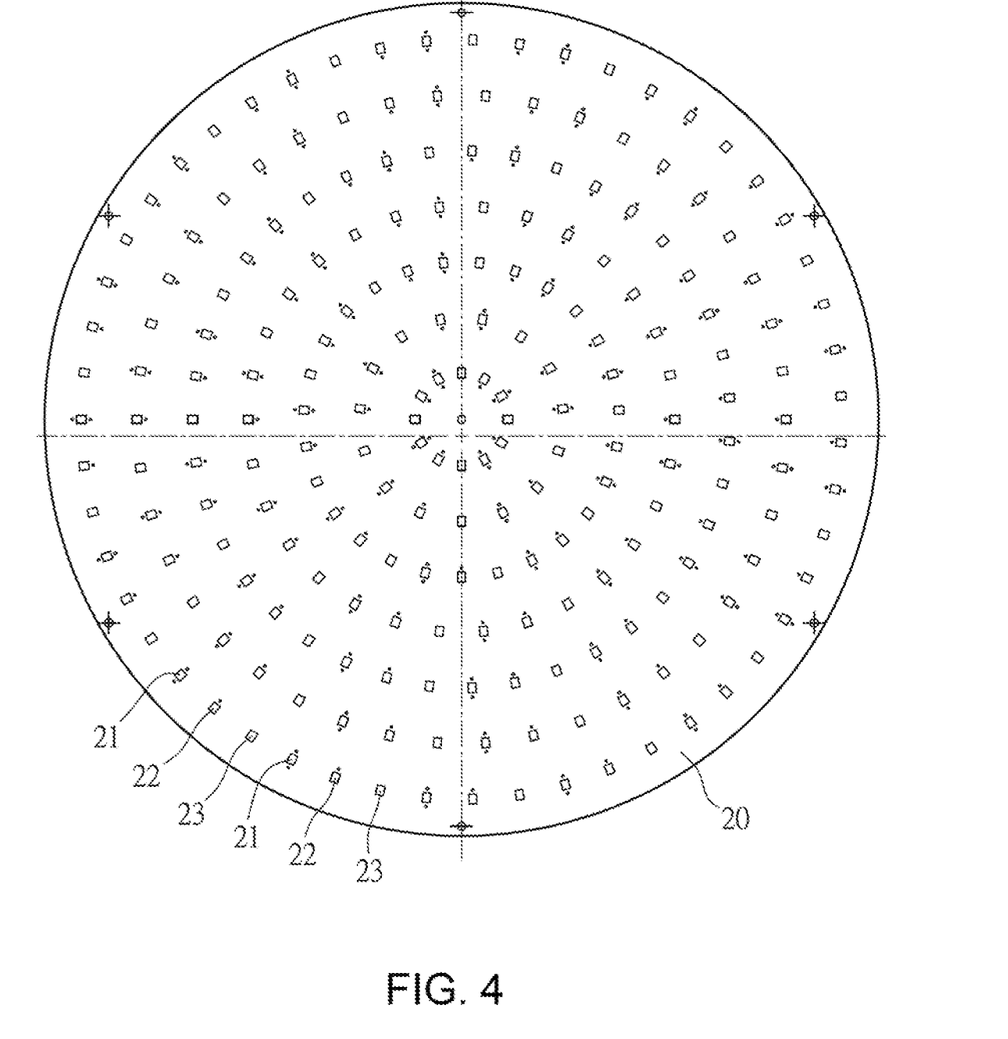
FIG. 4 is a plan view of the printed circuit board according to the present disclosure.

FIG. 4 is a plan view of the printed circuit board 20 according to the present disclosure. The plurality of first LEDs 21, second LEDs 22 and third LEDs 23 are installed on the printed circuit board 20 in an even distribution. Specifically, the plurality of first LEDs 21, second LEDs 22 and third LEDs 23 are embedded in the printed circuit board 20 and emit lights towards the inside of the lampshade 10. An installation quantity for each of the plurality of first LEDs 21, second LEDs 22 and third LEDs 23 is in a range from 10 to 100. In an exemplary embodiment of the present disclosure, there are a total of about 200 LEDs installed on the printed circuit board 20, and each LED size is 3.5×2.8 mm, but the present disclosure is not limited thereto. The size and quantity of LED can be adjusted according to the size of the printed circuit board 20.

As shown in FIG. 4, the plurality of first LEDs 21, second LEDs 22 and third LEDs 23 installed on the printed circuit board 20 are arranged into a pattern of concentric circles. The three LEDs 21, 22, 23 are disposed in an alternative arrangement in each concentric circle. Take the outermost circle as example, the second LED 22 is arranged next to the first LED 21, the third LED light 23 is arranged next to the second LED 22, and the first LED light 21 is arranged next to the third LED light 23. In other words, a set of one first LED 21, one second LED 22 and one third LED 23 are arranged in sequence in each concentric circle, and each concentric circle is provided with various amount of sets according to the circumference of circle. In the present embodiment, the smallest concentric circle has two sets of LEDs. In addition, each circle of the concentric circles includes at least one first LED 21, at least one second LED 22 and at least one third LED 23. In a preferred embodiment of the present disclosure, the plurality of first LEDs 21, second LEDs 22 and third LEDs 23 are provided with the same quantity in each concentric circle.

In an exemplary embodiment of the present disclosure, the value of color temperature of each first LED 21 is smaller than the value of color temperature of each second LED 22, and the value of color temperature of each second LED 22 is smaller than the value of color temperature of each third LED 23. Specifically, in a preferred embodiment of the present disclosure, the value of color temperature of each first LED 21 is in the range of 1800K-2700K, preferably 2200K, the value of color temperature of each second LED 22 is in the range of 3000K-4000K, preferably 4000K, and the value of color temperature of each third LED 23 is in the range of 5000K-7000K, preferably 6500K. The control unit 33 includes a pulse width modulation control circuit configured to respectively control the brightness of the plurality of first LEDs 21, second LEDs 22 and third LEDs 23 from 1%-100%, preferable 8%-100%, so that the entire value of color temperature of the sunlight-simulating sunlight lamp is adjustable in the range from 1800K-2700K to 5000K-7000K, preferably from 2200K to 6500K. In addition, in the present embodiment, when the plurality of first LEDs 21, second LEDs 22 and third LEDs 23 are tuned to the maximum brightness, the sunlight-simulating sunlight lamp reaches an illumination of 11000-16000 lux.

In the present embodiment of the present disclosure, the lampshade 10 further includes a light guide plate 15 attached thereon, and the light guide plate 15 is mounted between the lampshade 10 and the printed circuit board 20. As shown in FIG. 5, the light guide plate 15 is attached to the rear surface 13 of the lampshade 10 opposing the front surface 12 of the lampshade 10, and covers an opening at the rear surface 13 of the lampshade 10. When assembling the lampshade 10 and the holder 30, the light guide plate 15 is received in the space 40 formed between the lampshade 10 and the holder 30 and recessed towards the inside of the lampshade 10. The light guide plate 15 can be made of Polycarbonate which is different from the lampshade 10 formed by Polypropylene. The light guide plate 15 enables the LEDs to emit softer light.

Reference is made to FIG. 5. For the sake of concentrating the lights emitted by the plurality of first LEDs 21, second LEDs 22 and third LEDs 23 installed on the printed circuit board 20 on the lampshade 10, an upper surface 24 of the printed circuit board 20 and the side surface 36 of the holder 30 are preferably a white-polished reflecting surface.

Figure 6:
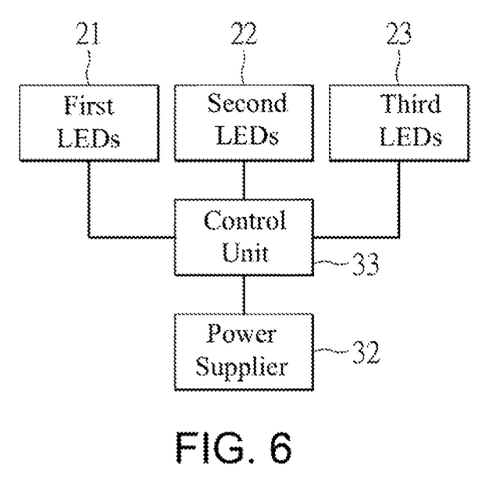
FIG. 6 is a schematic diagram illustrating the connection of the components according to the present disclosure.

FIG. 6 is a schematic diagram illustrating the connection of the components according to the present disclosure. The plurality of first LEDs 21, second LEDs 22 and third LEDs 23 are in parallel connection and connected to the control unit 33. The power supplier 32 is connected to the control unit 33 for supplying the power necessary for controlling the LEDs and the power necessary for powering on the LEDs. The control unit 33 includes a wireless connection circuit (not shown in the figures) configured to connect with a control device 50 wirelessly. Thus, the control device 50 can wirelessly transmit control signals to the control unit 33 to adjust the brightness of the LEDs or to turn on or turn off the LEDs.

The control device 50 can be a smart phone, a tablet, or a notebook, but the present disclosure is not limited thereto. The control device 50 can be any device which is capable of transmitting signals to the wireless connection circuit of the sunlight lamp. The wireless connection can be achieved by virtue of Bluetooth, or wireless local area network (WLAN).

Figure 7:
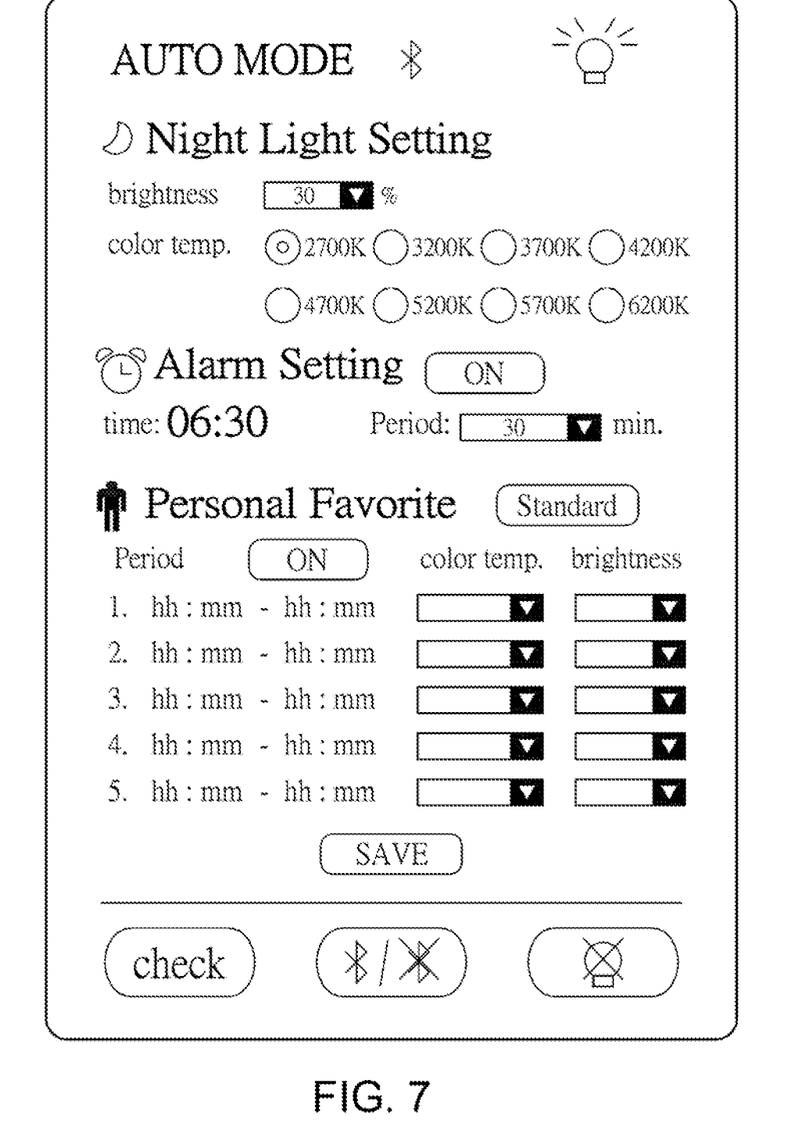
FIG. 7 is a schematic diagram illustrating one graphical user interface of the control device according to the present disclosure.

FIG. 7 is a schematic diagram illustrating one graphical user interface of the control device 50 according to the present disclosure. By using the graphical user interface, the user can set the sunlight lamp as "auto mode", so that the sunlight lamp can simulate natural daylight and emit lights having different color temperatures and brightness at the different time points. The night light, including brightness and eight kinds of preset color temperatures, can be set in the "auto mode", and the user can select a color temperature therefrom quickly according to personal favorite. In the "auto mode", alarm clock can be set to enable the sunlight lamp to be turned on at a preset time point and to last in preset time duration. In addition, the user can set multiple desired time periods and select different color temperatures and brightness in the "auto mode". In the selected time period, the sunlight lamp executes the user-defined set value with the high priority instead of emitting lights according to the preset "auto mode".

In an exemplary embodiment of the present disclosure, the color temperature of alarm clock can be made by gradual increase of color brightness of the plurality of first LEDs 21, second LEDs 22 and third LEDs 23 from the range 1%-30% (start point of the increase does not exceed 30%) to the range 30%-100% (finish point of the increase is not less than 30%), so that the entire color temperature of the sunlight-simulating sunlight lamp in "alarm clock" can be adjusted from the range of 1800K-4000K to the range of 5000K-7000K by applying the color temperature of two or three different types of LED, namely the color temperature of the first LEDs 21, the color temperature of the second LEDs 22 and/or the color temperature of the third LEDs 23. The control unit 33 has a timer which can set the sunlight-simulating sunlight lamp to start emitting light prior to the alarm time. The interval of the time can be selected from 3 to 60 minutes by user. The configuration of the "alarm clock" mode can be managed by the control device 50 which wirelessly transmits control signals to the control unit 33 to adjust the brightness of the LEDs or to turn on or turn off the LEDs through the timer.

Figure 8:
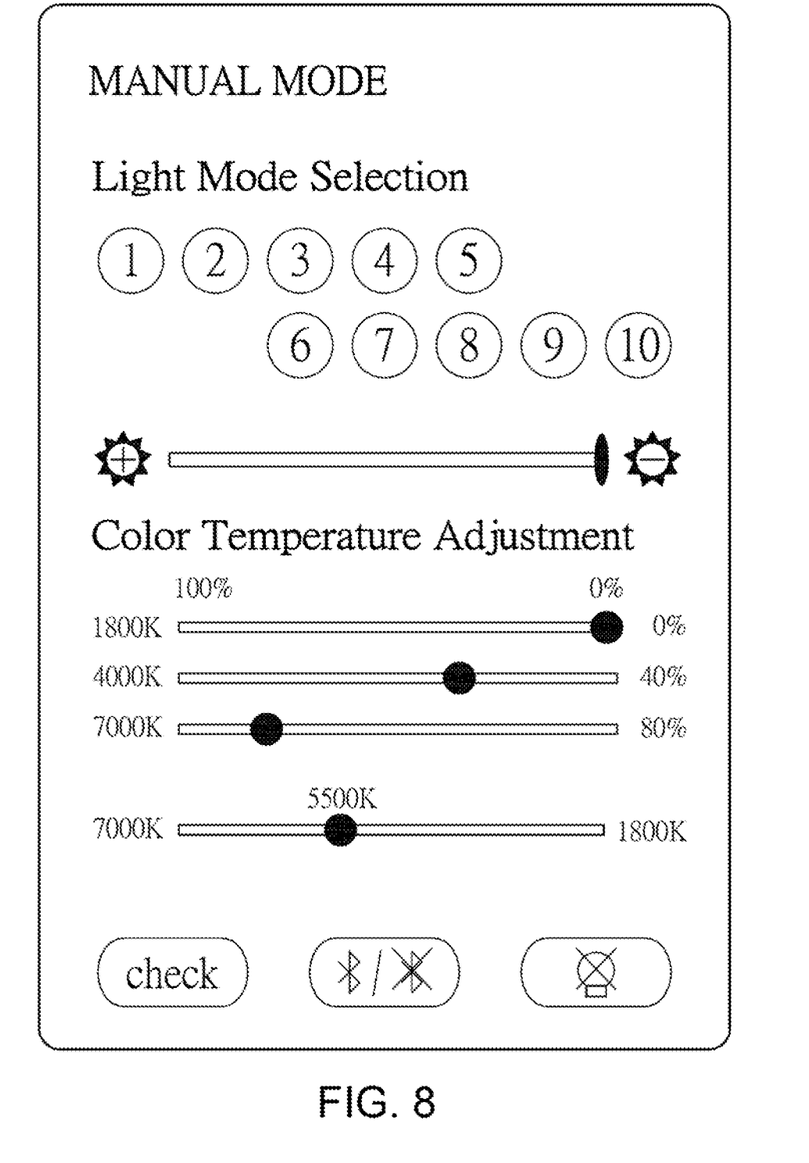
FIG. 8 is a schematic diagram illustrating another graphical user interface of the control device according to the present disclosure.

FIG. 8 is a schematic diagram illustrating another graphical user interface of the control device 50 according to the present disclosure. By means of the graphical user interface, the user can set the sunlight lamp as "manual mode". In the present embodiment, the user can store 10 manual modes in the control device 50, and selecting and adjusting the brightness of the plurality of first LEDs 21 (1800K-2700K), second LEDs 22 (3000K-4000K) and third LEDs 23 (5000-7000K) can be made in each "manual mode", allowing that the entire color temperature of the sunlight lamp can be adjusted in the range of 1800K to 7000K.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:
1. A sunlight-simulating sunlight lamp, comprising:
a plurality of first LEDs, second LEDs and third LEDs installed on a printed circuit board in an even distribution;
a holder disposed with a control unit and a power supplier; and
a lampshade made of a translucent material and mounted on the holder to form a space between the holder and the lampshade;
wherein the printed circuit board is received in the space;
wherein the plurality of first LEDs, second LEDs and third LEDs have respective color temperatures;
wherein the control unit controls respectively the brightness of the plurality of first LEDs, second LEDs and third LEDs;
wherein the plurality of first LEDs, second LEDs and third LEDs installed on the printed circuit board are arranged into a pattern of concentric circles;
wherein each concentric circle comprises at least one first LED, at least one second LED and at least one third LED;
wherein the plurality of first LEDs, second LEDs and third LEDs are provided with the same quantity in each concentric circle;

wherein the first LEDs, second LEDs and third LEDs are disposed in an alternative arrangement in each of the concentric circles wherein the control unit includes a timer, wherein the control unit is configured to adjust the color temperature of the first, second and third LEDs from a first color temperature to a second color temperature within 3 to 60 minutes, and wherein the first color temperature is smaller than the second color temperature; and wherein the first color temperature is in a range from 1800K to 4000K, and the second color temperature is in a range from 5000K to 7000K.

2. The sunlight-simulating sunlight lamp according to claim 1, wherein the color temperature of each first LED light is lower than the color temperature of each second LED light, and the color temperature of each second LED light is lower than the color temperature of each third LED light.

3. The sunlight-simulating sunlight lamp according to claim 1, wherein the control unit comprises a pulse width modulation control circuit configured to respectively control the brightness of the plurality of first LEDs, second LEDs and third LEDs from 1%-100%.

4. The sunlight-simulating sunlight lamp according to claim 1, wherein when the plurality of first LEDs, second LEDs and third LEDs have the maximum brightness, the sunlight-simulating sunlight lamp reaches an illumination of 16000 lux.

5. The sunlight-simulating sunlight lamp according to claim 1, wherein an installation quantity for each of the plurality of first LEDs, second LEDs and third LEDs installed on the printed circuit board is in the range of 10 to 100.

6. The sunlight-simulating sunlight lamp according to claim 1, wherein the lampshade comprises a light guide plate attached on the lampshade, and the light guide plate is mounted between the lampshade and the printed circuit board.

7. The sunlight-simulating sunlight lamp according to claim 6, wherein the light guide plate is recessed towards the inside of the lampshade.

8. The sunlight-simulating sunlight lamp according to claim 1, wherein a switch which is a capacitive sensor is disposed on a surface of the lampshade facing the holder.

9. The sunlight-simulating sunlight lamp according to claim 8, wherein the switch is at an outer periphery of the lampshade.

10. The sunlight-simulating sunlight lamp according to claim 1, wherein the plurality of first LEDs are in serial connection, the plurality of second LEDs are in serial connection, and the plurality of third LEDs are in serial connection.

11. The sunlight-simulating sunlight lamp according to claim 10, wherein the plurality of first LEDs, second LEDs and third LEDs are in parallel connection.

12. The sunlight-simulating sunlight lamp according to claim 1, wherein the control unit comprises a wireless connection circuit configured to connect with a control device.

13. The sunlight-simulating sunlight lamp according to claim 1, wherein a fourth LED configured to indicate that the sunlight-simulating sunlight lamp powered on is installed on an external surface of the holder.

* * * * *